UNITED STATES PATENT OFFICE.

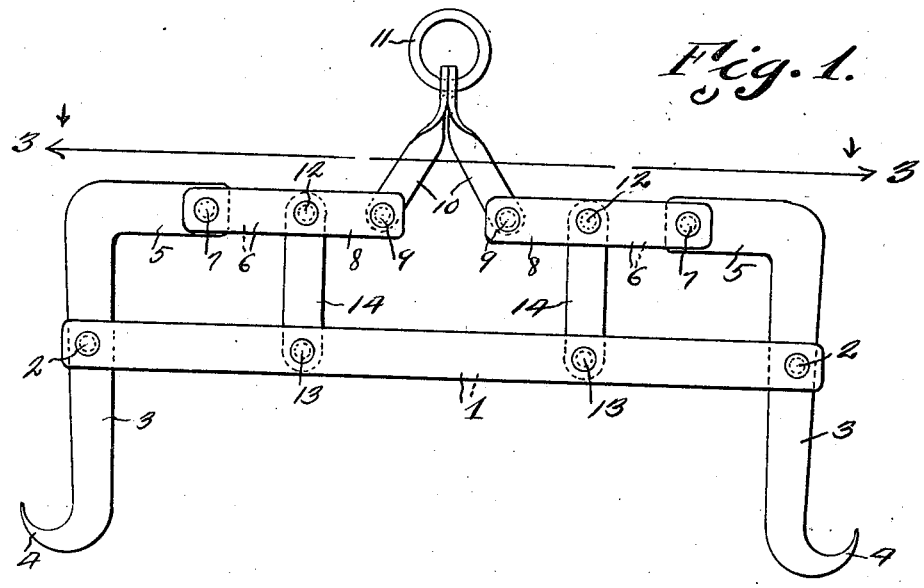
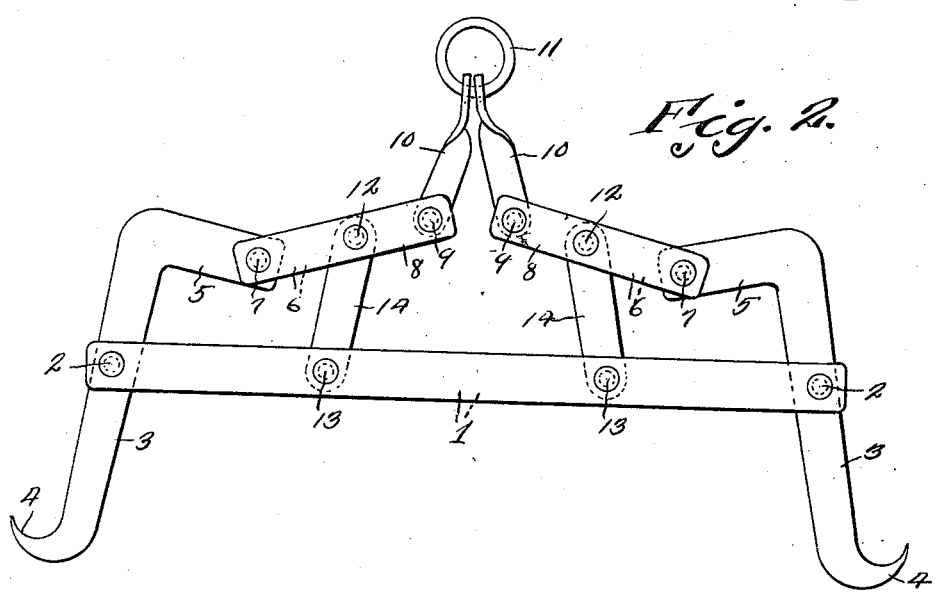
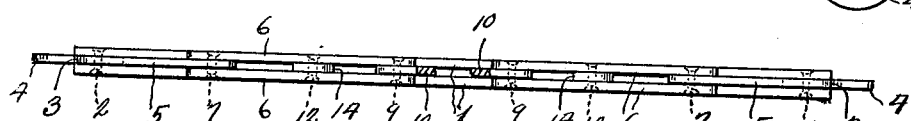

GEORGE VICKERS, OF DAYTON, OHIO.

GAMBREL.

1,311,361.　　　　Specification of Letters Patent.　　Patented July 29, 1919.

Application filed November 27, 1918.　Serial No. 264,400.

*To all whom it may concern:*

Be it known that I, GEORGE VICKERS, a citizen of the United States, residing at Dayton, in the county of Montgomery, State of Ohio, have invented a new and useful Gambrel; and I do hereby declare the following to be a full, clear, and exact description of the invention, such as will enable others skilled in the art to which it appertains to make and use the same.

This invention relates to gambrels as used by butchers, and it is the object of the invention to provide a gambrel wherein the legs of the carcass will be spread apart, by the weight of the carcass so as to facilitate the splitting operation and also to provide a carcass supporting apparatus that will spread the hind legs of any size or kind of carcass without the necessity of adjusting the same.

A further object is to so construct a butchering gambrel so that the necessity of adjusting the same to various sizes of carcasses is eliminated.

With the above and other objects in view, the invention consists of the combination and arrangement of parts as hereinafter set forth and claimed.

Referring to the drawings:—

Figure 1 is a side elevation of the gambrel, showing the same in normal position.

Fig. 2 is a side elevation showing the leg engaging arms spread apart as in use.

Fig. 3 is a plan view taken on line 3—3 of Fig. 1, showing the parts in normal positions.

Referring to the drawings the numeral 1 designates a pair of horizontal bars and pivoted to the horizontal bars as at 2 are leg engaging arms 3, which are provided with outwardly extending and upturned hooks 4 adapted to hook into the flesh of the hind legs of a carcass, thereby suspending the same for splitting by a butcher. The arms 3, at their upper ends are provided with right angle inturned arms 5, which are in turn pivoted to links 6 as at 7, the links 6 have their inner ends 8 pivoted as at 9 to upwardly extending links 10, the upper ends of which are provided with apertures for the reception of a ring 11 which is adapted to pass over a hook or other gambrel supporting means. Pivotally secured to the links 6 and the horizontal bars 1, as at 12 and 13 are links 14, which serve as spacing and guiding means for the links 6 and arms 5 when the carcass is suspended by its hind legs from the hooks 4, which are forced outwardly by the weight of the carcass which causes a rocking of the bars 6 and consequent inward pull upon the arms 5. By referring to Fig. 2 it will be seen that the links 14 not only keep the links 6 and horizontal bars 1 spaced apart, but their upper ends which are pivoted to the links 6 move inwardly under the control of the weight of the carcass and the legs are thereby spread to their limit.

From the above it will be seen that the gambrel is positive in action and that it requires no adjustment of the parts to accommodate various sizes and kinds of carcasses.

The invention having been set forth, what is claimed as new and useful is:—

1. A gambrel comprising a horizontal bar, right angled arms for engaging the legs of a carcass pivoted to its ends, said right angled arms having their inturned arms pivoted to rocking links, said links having their inner ends pivoted to supporting links and pivoted spacing links pivoted to the horizontal bar and the rockable links.

2. A gambrel comprising a horizontal bar, leg engaging arms pivoted to the ends of said horizontal bar, said leg engaging arms comprising angled members, one of the arms of said angled members being provided with hooks for engaging the legs of a carcass, the other arms of said angled members having their ends pivoted to the ends of pivoted and rockable links, said links having their other ends pivoted to suspending links and spacing links pivoted to the rockable links and the horizontal bar.

In testimony whereof I have signed my name to this specification in the presence of two subscribing witnesses.

GEORGE VICKERS.

Witnesses:
SHELLY L. CAYLOR,
J. P. SMITH.

Copies of this patent may be obtained for five cents each, by addressing the "Commissioner of Patents, Washington, D. C."